US010290007B2

(12) United States Patent
Maier et al.

(10) Patent No.: US 10,290,007 B2
(45) Date of Patent: May 14, 2019

(54) METHOD AND SYSTEM FOR TURNING VIRTUAL WORLD PARTICIPANTS INTO REAL LIFE LEADS

(75) Inventors: Albert Maier, Tuebingen (DE); Dirk Nowak, Nierstein (DE); Martin Oberhofer, Bondorf (DE); Thomas Schwarz, Stuttgart (DE); Baxter R. Yazbek, Ludwigsburg (DE)

(73) Assignee: International Business Machines Corporation, Armonk, NY (US)

( * ) Notice: Subject to any disclaimer, the term of this patent is extended or adjusted under 35 U.S.C. 154(b) by 1345 days.

(21) Appl. No.: 12/357,514

(22) Filed: Jan. 22, 2009

(65) Prior Publication Data

US 2010/0185510 A1 Jul. 22, 2010

(51) Int. Cl.
*G06Q 30/00* (2012.01)
*G06Q 30/02* (2012.01)

(52) U.S. Cl.
CPC .......... *G06Q 30/02* (2013.01); *G06Q 30/0251* (2013.01)

(58) Field of Classification Search
CPC ............................ G06Q 30/02; G06Q 30/0251
USPC ....................................................... 705/7.29
See application file for complete search history.

(56) References Cited

U.S. PATENT DOCUMENTS

| 7,485,040 B2 * | 2/2009 | Walker ............... G06Q 30/0207 463/20 |
| 8,055,766 B2 * | 11/2011 | Bloebaum et al. ........... 709/224 |
| 8,892,999 B2 * | 11/2014 | Nims et al. .................... 715/706 |
| 9,773,037 B2 * | 9/2017 | Reich ................ G06F 17/30365 |
| 2002/0090985 A1 * | 7/2002 | Tochner ................... A63F 13/12 463/1 |
| 2004/0128619 A1 * | 7/2004 | McCall ......................... 715/513 |
| 2006/0031578 A1 * | 2/2006 | Pelletier ........................ 709/245 |
| 2006/0074755 A1 * | 4/2006 | Juetten ................... G06Q 30/02 705/14.32 |
| 2006/0173837 A1 * | 8/2006 | Berstis ................... G06Q 30/02 |

(Continued)

OTHER PUBLICATIONS

Arakji, Reina Y., and Karl Reiner Lang. "Avatar business value analysis: a method for the evaluation of business value creation in virtual commerce." Journal of Economic Commerce Research (2008).*

(Continued)

*Primary Examiner* — Folashade Anderson
(74) *Attorney, Agent, or Firm* — Sughrue Mion, PLLC (57) ABSTRACT

The present disclosure details a method and system used for turning human participants who control avatars in a virtual world setting into real life marketing leads. In one embodiment, a virtual location is presented within a virtual world to facilitate interaction with an avatar. The avatar is identified within a master data management system, and a profile of the human behind the avatar is created or retrieved. To encourage the human user to provide real-world information through the avatar within the virtual world, an incentive is offered and awarded as necessary. The real-world information about the human user, such as address or demographic information about the human user is collected and stored in the profile, and eventually synchronized with a CRM system. As appropriate, the data collected and compiled in the CRM system may be used to launch marketing campaigns.

10 Claims, 5 Drawing Sheets

(56) References Cited

U.S. PATENT DOCUMENTS

| | | | |
|---|---|---|---|
| 2007/0138268 A1* | 6/2007 | Tuchman | G06Q 30/02 235/383 |
| 2007/0156509 A1* | 7/2007 | Jung | G06Q 30/0209 705/14.12 |
| 2007/0203738 A1* | 8/2007 | Jaschke | G06Q 30/02 705/1.1 |
| 2007/0203828 A1* | 8/2007 | Jung et al. | 705/38 |
| 2008/0091692 A1* | 4/2008 | Keith et al. | 707/100 |
| 2009/0157495 A1* | 6/2009 | Cahuzac | G06Q 30/0222 705/14.23 |
| 2009/0158200 A1* | 6/2009 | Palahnuk et al. | 715/781 |
| 2009/0227374 A1* | 9/2009 | Tirpak et al. | 463/40 |
| 2009/0247282 A1* | 10/2009 | Cheng | A63F 13/12 463/25 |
| 2010/0125800 A1* | 5/2010 | Jana et al. | 715/757 |
| 2010/0131876 A1* | 5/2010 | McGuire et al. | 715/765 |
| 2010/0162149 A1* | 6/2010 | Sheleheda | A63F 13/12 715/764 |
| 2010/0169795 A1* | 7/2010 | Hyndman et al. | 715/757 |
| 2016/0321673 A1* | 11/2016 | Kallman | G06F 17/30365 |

OTHER PUBLICATIONS

Wood, Richard TA, Mark D. Griffiths, and Virginia Eatough. "On-line data collection from video game players: Methodological issues." CyberPsychology & Behavior 7.5 (2004): 511-518.*

Kaplan, Andreas M., and Michael Haenlein. "The fairyland of Second Life: Virtual social worlds and how to use them." Business horizons 52.6 (2009): 563-572.*

Schubert, Petra, and Mark Ginsburg. "Virtual communities of transaction: The role of personalization in electronic commerce." Electronic Markets 10.1 (2000): 45-55.*

Does Second Life mean a new world for CRM?, Barney Beal, SearchCRM.com, May 17, 2007, http://searchcrm.techtarget.com/news/article/0,289142,sid11_gci1255404,00.html.

Avatar-Based Marketing, Paul Hemp, Harvard Business Review, Jun. 2006, 9 pages.

Marketing to avatars, we make money not art blog, May 31, 2006, http://www.we-make-money-not-art.com/archives/2006/05/-take-a-minuteg.php.

* cited by examiner

METHOD AND SYSTEM FOR TURNING VIRTUAL WORLD PARTICIPANTS INTO REAL LIFE LEADS

FIELD OF THE INVENTION

The present invention generally relates to data activities performed within virtual worlds. The present invention more specifically relates to a method and a system used to generate real life leads for participants of virtual worlds and interact with real world Customer Relationship Management (CRM) systems, useful for activities such as selling products to the participant in the real world if initial interest was shown by the participant in the virtual world.

BACKGROUND OF THE INVENTION

There are many approaches to "virtual commerce", which attempts to connect virtual worlds with the real world and use virtual worlds as an additional contact channel for real-world marketing purposes. For example, marketing in the form of virtual products based on real-world products and advertisements for the real-world products themselves have been commonly deployed to avatars in virtual world environments such as Second Life. Further, some companies have even provided technical support or additional information about their real life services or products within the virtual environment in an attempt to increase exposure to these services or products to the users behind the virtual world avatars.

Many of the existing approaches taken by companies have focused on doing business or advertising in a virtual world to make real world money. However, these techniques often fail to make a connection to establish substantive business in real life, as they fail to connect the real-world user of the virtual avatar with the activities of the virtual avatar participating in the virtual world. Therefore, current systems have been unable to perform effective real-world marketing campaigns on persons who participate in virtual worlds. There is a need in the art to utilize techniques which make customer relationship management on the real world persons behind avatars cheaper and more effective.

BRIEF SUMMARY OF THE INVENTION

One aspect of the present invention utilizes a method and system which connects to the users within virtual worlds by attracting virtual world participants to reveal parts of their real world identity. This method and system enables a very effective real-world customer relationship management for the persons behind avatars, because its techniques are able to investigate, develop, and manage relationships between the avatars and their human controllers. Further, application of these disclosed techniques are able to propagate useful information to Customer Relationship Management (CRM) systems, thus supporting cheaper and more effective real world marketing campaigns on the persons behind the avatars.

Another aspect of the present invention is to enable a back-end processing system capable of collecting and filtering useful customer information from the virtual world. In one embodiment, one or more CRM systems are connected to a Master Data Management (MDM) system, with the MDM system being integrated with a virtual world communication component to collect data and leads from virtual worlds. This implementation is capable of covering end-to-end business processes, and therefore may enable the collection of data with significant business value.

A further aspect of the present invention includes use of a "Virtual World Connector" which uses the data and logic from the MDM system to determine whether the real life person behind the avatar is already known within the MDM system. Just as logic is applied to new real world leads to prevent duplicate customer profiles, similar logic may be applied to the profile of real life persons behind avatars.

In one embodiment, an operation useful for turning virtual world participants into real life leads is performed within a virtual world by presenting a virtual location for access by an avatar. The avatar is controlled by a human user, and this human user is the entity that the system ultimately wishes to collect data from. The virtual location may include a virtual storefront or other location for interaction within the virtual world, where the avatar is able to communicate within the virtual world with a virtual agent or entity (which may be fully automated). Accordingly, once the avatar is at the virtual location and begins to communicate, data will be collected from the avatar from within the virtual world.

Next, the avatar is identified based on characteristics of the avatar that are used within the virtual world, including avatar ID and avatar name. These identifying characteristics are correlated with customer registrations stored in a MDM system based on the identified characteristics of the avatar, to determine if a real-world human customer is associated with the avatar. If no customer registration exists, a new one is created; otherwise the customer registration is located and retrieved by the MDM system.

The interaction and communications with the avatar may be used to offer an incentive to obtain real-world information about the human user operating the avatar. The incentive may be real-world or virtual, relating to the real-world human or the avatar. Once real-world information such as name and address, demographic information, follow-up surveys, and other valuable information for marketing purposes is collected from the avatar, any offered incentive is awarded. Depending on the form of the incentive, this may involve providing the incentive virtually (i.e., in the virtual world), or in a real-world electronic or physical form.

Additionally, the real-world information provided by the human user through the avatar interaction is stored into the customer registration within the MDM system. Once the information on the human users is fully collected, the information is propagated to one or more CRM systems that are connected to the MDM system. The data in the CRM system enables the launch of marketing campaigns and activities directed towards the human user (or groups of human users), to utilize the real-world information about the human users that has been collected and compiled by the MDM system.

In further embodiments, the MDM system may be used to enrich and complete customer data fields. Thus, even if an avatar provided incomplete information, such as not providing a phone number, an MDM system might be able to add it to the human user's profile by accessing external data sources with the real world name and address of the person. Likewise, information relevant to the customer but not directly known by the human user (such as a credit rating) may be compiled for the customer by the MDM system. After the information has been sufficiently completed for the customer profile, the information can then be pushed out to the CRM systems.

In additional embodiments, the information provided by the real world user operating the avatar is verified before being associated with the customer, in order to identify duplicate or missing user information. Also, in additional embodiments, the human user may be associated with one or more avatars within the virtual world. If multiple avatars are recognized, the MDM system associates all of the avatars with the customer, to prevent redundant or incomplete customer profiles.

DETAILED DESCRIPTION OF THE INVENTION

One object of the present invention is to enable a company wanting to attract the 3D Internet generation to create leads and ultimately sell products and services if initial interest was shown in the virtual world. Therefore, a significant advantage of the present invention is that it enables companies to use cheaper and more effective customer relationship management methods directed to the real world persons behind avatars. In one embodiment of the present invention, a strategy executed for collecting CRM-relevant data from the real world participants of a virtual world contains the following characteristics:

Avatars will receive an incentive for revealing personal information. For example, they could get a virtual incentive like attractive shoes for the avatar, virtual currency, or other valuable items within the virtual world. Additionally, specific real-life incentives might be issued to the human user behind the avatar, such as mp3 songs or vouchers for some higher value incentives. The value of the incentive may depend on the type of information and how much information the avatar is willing to provide. Information gathered from the avatar could not only include personal information, but also CRM relevant information like the person's opinion on certain product groups or his/her preferred contact channel.

Once the information is collected from the avatar within the virtual world, the information is sent to a master data management (MDM) system with analytic capabilities. The analysis performed on this data may include: (a) determining whether the real life person behind the avatar is already known to the system (a person can have many avatars and can play in different virtual worlds and/or the person might already be a known customer in real life); (b) determining whether all the information provided by the user is already known; and (c) detecting how this person relates to other real life persons known to the system (e.g., does this person live in the same household as any other known persons).

In case that the avatar corresponds to an unknown real life person or in case that there is new CRM-relevant information available (like a postal addresses or new household information), this information will be distributed to the CRM system(s) that is registered with the MDM system. Such a registration can be based on certain characteristics of the persons-for example, there might be one CRM system responsible for European customers and a second one for US customers. In case that a new real life person has been added to the MDM system, a lead will be created in the respective CRM systems.

Once the information is fully collected and analyzed, the CRM system can now apply its usual modus operandi. For example, the CRM system could run a dedicated marketing campaign in real life on the newly inserted leads, as it takes the information provided in the virtual world and the information determined by the MDM system into account when running this campaign. It could, for example, send information only if it has not been sent to the respective household in the past, or it could use the preferred contact method specified by the avatar, and refer to the answers the avatar has given in the survey.

Finally, each CRM system is synchronized back with the central MDM system described above for all information that is relevant for the detection of duplicate entries and the determination of the relationships between real world persons. Thus, in the case that a new lead is directly inserted into the CRM system by a customer advisor, this information is sent to the MDM system to create a customer profile.

Consistent with the embodiments of the present invention described above, there may be many CRM systems that are in use, but there is only a single MDM system which is the master system for all customer profile data. State of the art CRM systems typically do not offer strong capabilities to standardize and cleanse incoming data and to detect potential duplicates, but such tasks are core capabilities of an MDM system. Therefore, after avatar records and customer records are first identified and created in the MDM system, the CRM-relevant customer information will then be pushed to the CRM system(s).

Figure 1:
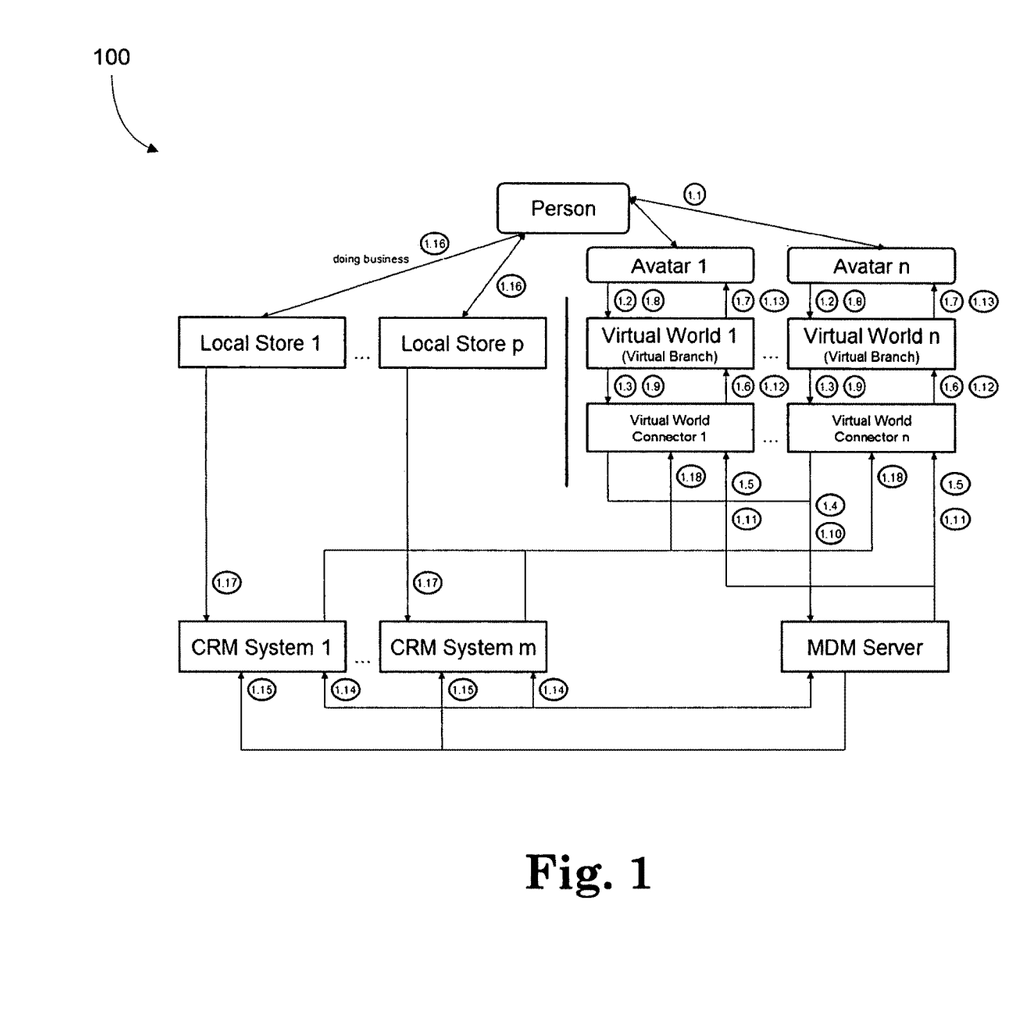
FIG. 1 illustrates a system architecture used for turning virtual world participants into real life leads in accordance with one embodiment of the present invention.

FIG. 1 illustrates an example system architecture 100 utilized to implement an operation for turning virtual world participants into real life leads in accordance with one embodiment of the present invention. The relevant information collected from the human user of the avatar flows through the system using a process similar to the example provided as follows:

1. A real world person uses an avatar (step 1.1) to participate (1.2) in a virtual world. From an infrastructure point of view, this typically means that a virtual world client is running on this person's computer and the avatar actions are controlled by the person through this client. The technical identification of an avatar is typically given by a unique avatar ID within the virtual world and an avatar name. The true identity of the person, i.e. the real world name, address, contact information, and the like for the human controlling the avatar, is usually not visible for other participants in a virtual world.

2. The processing starts as soon as an avatar in the virtual world visits the virtual location associated with the company or organization, or otherwise commences interaction with the company or organization in some virtual location (for example, at a virtual branch of a company that is presented within the virtual world). As soon as the interaction of the avatar in this virtual location starts, an event is triggered from the virtual world to the virtual world connector (1.3). The event received by the virtual world connector contains information to identify the avatar, such as the avatar ID and the avatar name.

3. The virtual world connector then communicates with external computer systems to relate the avatar and data from the virtual world with relevant data contained in other information management systems. As an example, this connector may be configured to invoke a createAvatarPerson( ) service on the MDM System (1.4).

4. The MDM Server would then process the createAvatarPerson( ) service request and respond (1.5) to the virtual world connector with one of the following results: (a) the new avatar was successfully registered in the MDM system (further explained in the description of the data model section and FIG. 3 below); or (b) the avatar already exists (determined by having the MDM Server perform a check to prevent duplicate records) and real-world person information related to the avatar exists or does not exist in the MDM system. In summary, the avatar data and the customer master data are stored in the MDM system. The virtual world connector communicates with the MDM system to perform checks to determine whether the avatar and the real-world human customer behind the avatar are already known to the system.

5. The virtual world connector receives the response from the MDM Server, and depending on whether the avatar already exists in the MDM Server, an interaction is triggered with the virtual world (1.6) as follows:

a) If a new avatar was registered, the virtual world connector triggers a dialog with the avatar (1.7) in the virtual branch offering an incentive so that the person playing the avatar will provide real world customer information about themselves. Such an incentive could, for example, be a certificate to get a 20% discount on a purchase of a product in a local real-world branch. The process could also, for example, offer to mail this certificate to the person, thus providing an extra motivation for the person to provide an accurate real-world address.

b) If the avatar already exists and was registered in the MDM server, two cases are possible: (i) the avatar may be registered, but no real-world person data is yet associated with it or the data is otherwise incomplete. In this case, the virtual world connector triggers a "welcome back" message for the avatar and the dialog again offers an incentive (which may be a better incentive) as outlined above. (ii) If the avatar is already registered and the real-world person data was already captured in previous interactions in the virtual location, then a "welcome back" message for the real-world person is provided, and any new business interaction for returning customers will attempt to be collected in the form of surveys or other follow-up customer activities initiated by the CRM system (as is performed in step 1.18 detailed below).

6. In the case where the dialog starts based on the fact that the avatar is recognized and registered as a new customer, then the customer information is mined and prepared for use in real-world activities. Specifically, if the person using the avatar accepts the incentive (1.8) and provides through the avatar the real-world customer information (such as first name, last name, address, contact information, etc.), all relevant information to request the creation of a new customer on the MDM Server is handed over to the virtual world connector (1.9). Before the virtual world connector invokes a createCustomer( ) service on the MDM System (1.10) it might invoke algorithms to verify and check the received customer data. One example is postal address verification to find out whether or not the address information provided is an existing real-world address.

Figure 3:
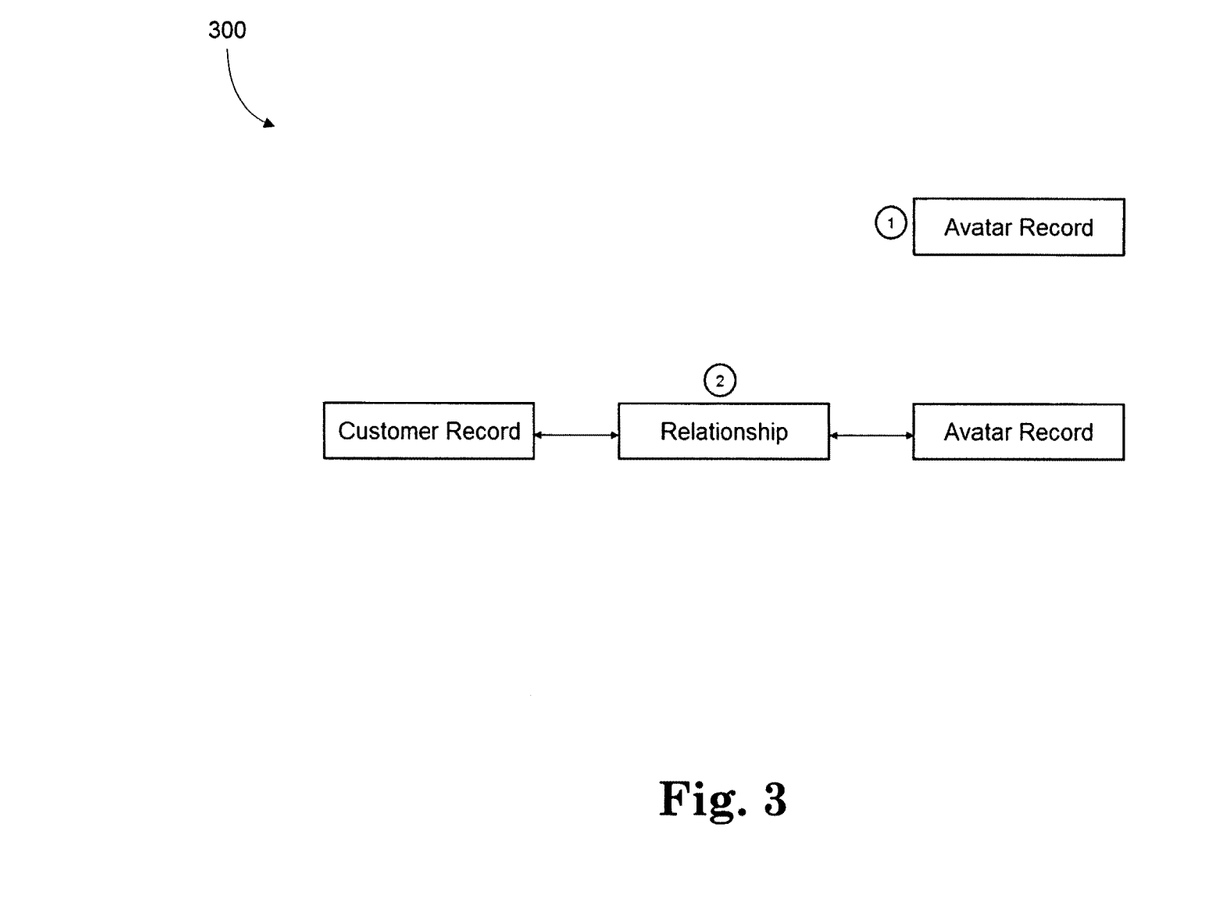
FIG. 3 illustrates a data model used for establishing a relationship between a customer and an avatar record in accordance with one embodiment of the present invention.
Figure 4:
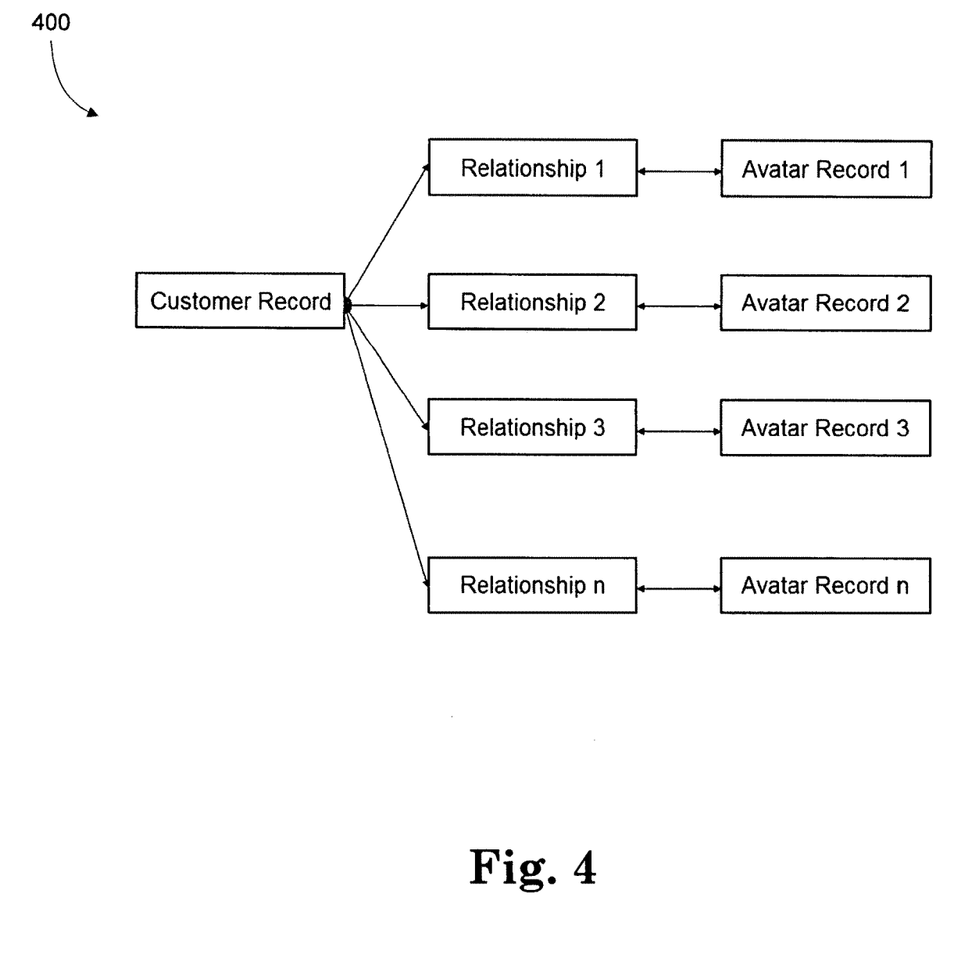
FIG. 4 illustrates a data model used for establishing a relationship between multiple avatar records and the same real-world person in accordance with one embodiment of the present invention.

7. The MDM Server executes the createCustomer( ) service request. The input to this request is the real-world person information and the avatar id to which the real-world person is associated with. The output (1.11) is sent back to the virtual world connector with one of the following results:

a) The Customer record is successfully created and the relationship to the avatar ID is established (as is further described in FIG. 3 detailing the applicable data model). In this case, the CRM-relevant customer information is pushed by the MDM Server to the CRM System (1.14). Here a separate master data synchronization component can exist in addition in the system landscape. (Such a synchronization component could also be integral part of the MDM system, but is not depicted for simplicity.) The push of CRM-relevant customer master data from the MDM Server to the CRM system can be implemented synchronously or asynchronously. Furthermore, the MDM Server initiates a createLead( ) operation (1.15) on the CRM system related to the customer created in (1.14) on the CRM system. Again, the createLead( ) operation can be implemented synchronously or asynchronously.

b) The Customer record already exists (the MDM Server checks and prevents duplicate records), but an avatar ID was not yet related to it, as only a relationship between the existing person and the new avatar was created. (This case is possible if the same person uses several avatars in the same or different virtual worlds, as is depicted in FIG. 4 below.)

8. If a new customer was created or a new avatar id was registered to an existing person, the virtual world connector (1.12) triggers the incentive to be received by either the avatar or the real person behind the avatar (1.13). (This depends on the type of incentive, e.g. shoes for an avatar would always be handed over to the avatar whereas a certificate for a real-world store could either be handed over to the avatar and printed out by the person, or could be mailed to the person using the real-world address that is now known.)

9. Depending on the incentive, the person could visit a local store (1.16) or perform another real-world activity to materialize the incentive. In this case, the computing system of the local store would trigger an update (1.17) on the CRM system that the incentive was used. This allows measurement in the CRM system if the marketing of products through the virtual world channel is successful.

10. If the returning customer is identified as in (5.) above, the virtual world connector can check with the CRM system whether or not a survey or other follow-up activity should be run in the virtual world, which may ask the person through the avatar if the person is satisfied with the product, what new features the product should have in the next version, etc. This extends the reach of survey and marketing campaigns from the real world to the virtual world (while still enabling traditional surveys by calling the person or sending mail surveys).

Figure 2:
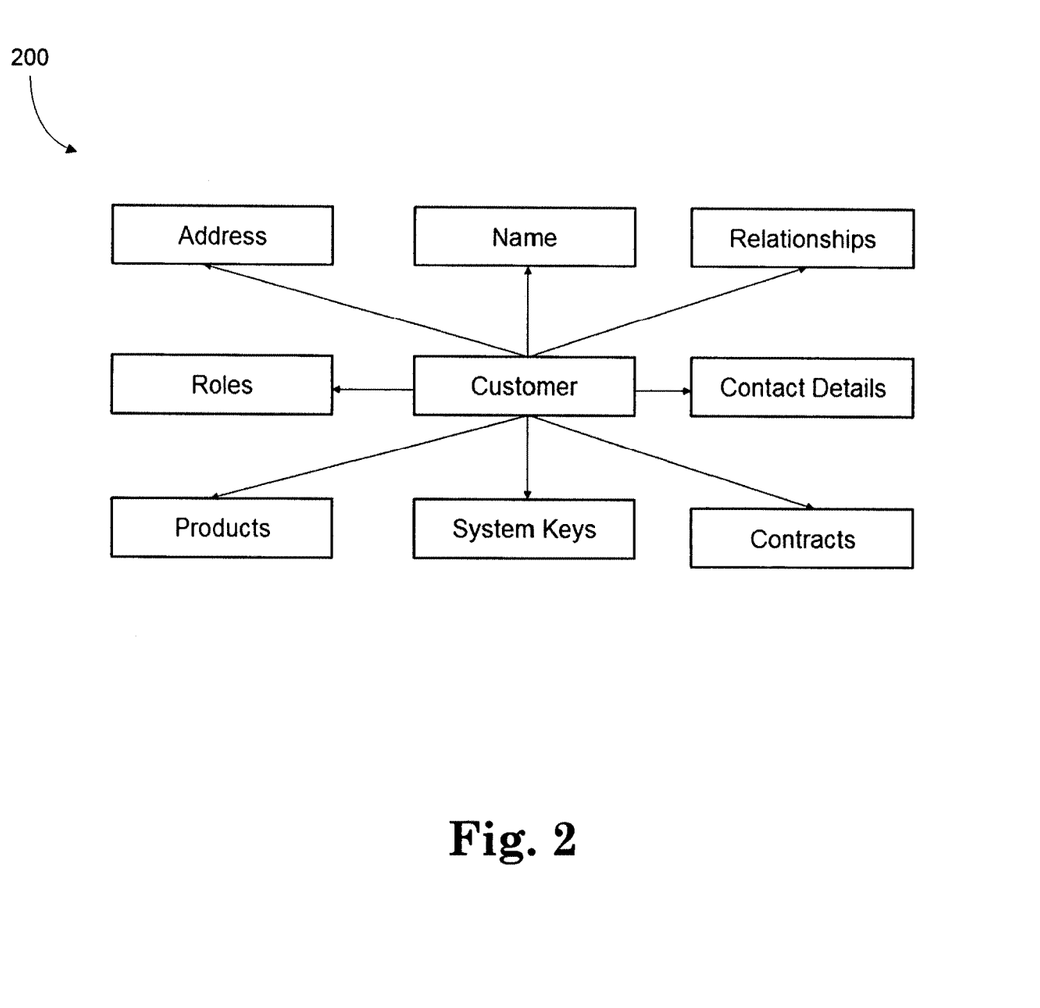
FIG. 2 illustrates a data model supporting the system architecture used for turning virtual world participants into real life leads in accordance with one embodiment of the present invention.

FIG. 2 illustrates a Customer data model 200 supporting the previously described operations and virtual interaction architecture in accordance with one embodiment of the present invention. More specifically, FIG. 2 illustrates a high-level overview of the data model used within an MDM Server for storing customer master data. Typically, there are areas for capturing information like Address, Name, Relationship, Role, Contact Details, Products the customer purchased, System Keys, and Contract.

If the data model is designed with sufficient flexibility, a record storing the avatar information can be an instantiation of the customer data model (using the name area for storing the avatar name and the system keys area for storing the avatar ID), i.e. the information about real-world persons and avatars can both be stored as instances of type "customer". (If not, a new type has to be created in the data model of the MDM Server and related to a customer record using the relationship area of the customer data model.)

FIG. 3 illustrates a data model 300 used for creating an Avatar and a Customer record and relating them to each other in accordance with one embodiment of the present invention. As discussed with respect to FIG. 1, if step 1.5 succeeds, the MDM Server creates a new avatar record (record 1 as shown in FIG. 3) in the MDM System instantiating the customer data model. This may be implemented in conjunction with step 1.10 of FIG. 1, so that when the real-world person information is received along with the avatar ID, the MDM System checks if the avatar has a relationship with a person already being tracked as customer.

If no relationship exists, a customer record is created and a relationship record (record 2) between the customer record and the avatar record are established as shown in FIG. 3. If a relationship does exist, then this person exists already in the system with relationships to other avatar records, and only a new relationship between the existing person and the new avatar id as part of this request is created. FIG. 4 further illustrates a data model 400 used for relating multiple avatar records to the same real-world person in accordance with one embodiment of the present invention. As is evident, this case is possible if a person uses one or more avatars in the same or different virtual worlds.

In a further embodiment, the virtual world connector and the virtual world can exchange information on various protocols. For one implementation, the messaging protocol supporting the chat infrastructure built into virtual worlds such as Second Life may be utilized.

In order to avoid "fake" customer information, validation may be utilized for the data received through the avatar prior to invoking the createCustomer( ) service in step 1.10. For example, the name and address data may be checked for a real name and the address can be verified using software components such as IBM® InfoSphere QualityStage. This verification reduces the chance that a person receives the incentive without providing the information the business is interested in. Invalid data can be reduced although not completely prevented because it is hard if not impossible to determine if the person playing the avatar is using the identity of another real-world person. Additionally, the MDM Server may have this data validation built into its services such as createCustomer( ). In such a case, the virtual world connector does not need to call such functions prior to calling the service by the MDM Server because it is part of the createCustomer( ) service itself.

As described with relation to FIG. 1, this embodiment implements steps 1.14 and 1.15 (creating the customer and creating the marketing lead for the customer) synchronously. This means that the function of the createCustomer( ) service (step 1.10) is extended in such a way that the createCustomer( ) service only completes successfully if both of steps 1.14 and 1.15 succeeded successfully.

In a further embodiment, the customer master data can be changed on the CRM system side or the MDM Server side. Therefore, it is mandatory to synchronize these two systems. For the synchronization, there could be an additional synchronization component in the system architecture not shown in FIG. 1. It is mandatory that the synchronization is implemented in such a way that a master data change initiated on the CRM side is persisted on the CRM side if and only if approved by the MDM Server through the synchronization infrastructure between the two systems.

Figure 5:
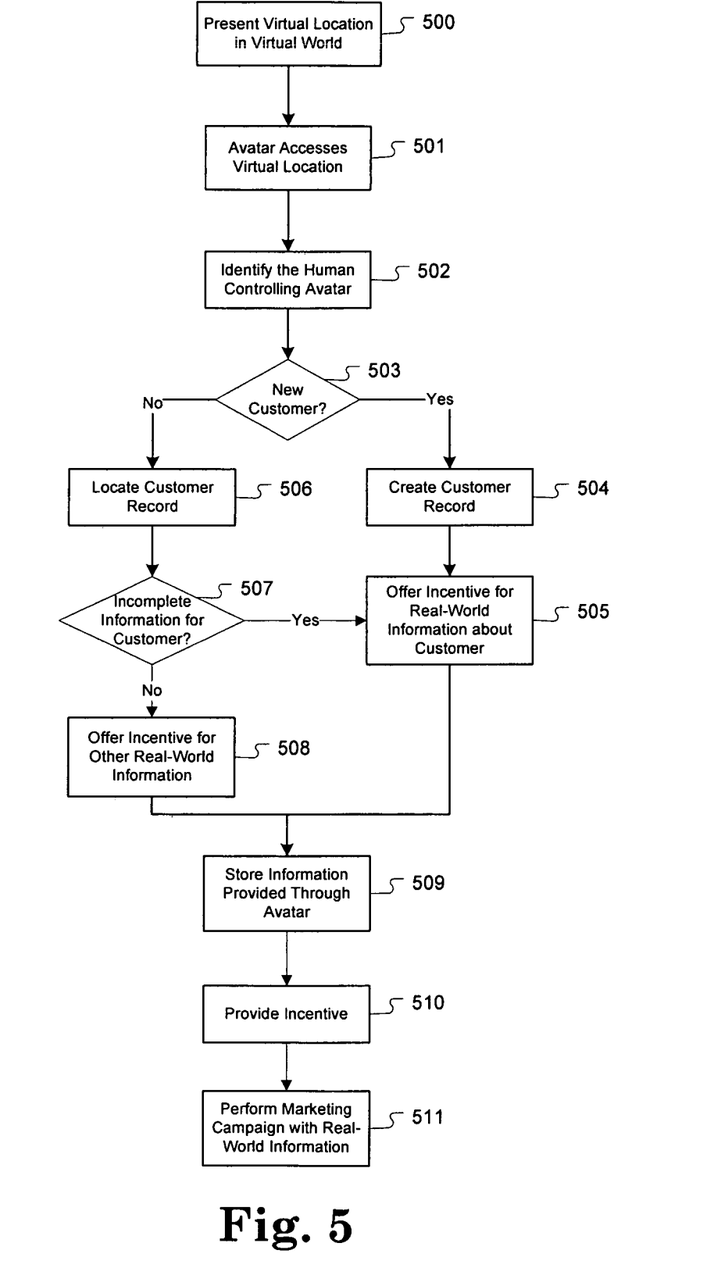
FIG. 5 illustrates a flowchart depicting an operation for turning virtual world participants into real life leads in accordance with one embodiment of the present invention

A flowchart illustrating a simplified operation for turning virtual world participants into real life leads according to one embodiment of the present invention is depicted in FIG. 5. As shown, the operation is initiated with the presentation of a virtual location in a virtual world as in step 500 in order to commence interaction with the human operating the avatar in the virtual world at this virtual location. After the avatar accesses the virtual location as in step 501, the human controlling the avatar is identified as in step 502, to determine if a profile for the human controlling the avatar has been created and associated with the avatar identification records stored in the MDM system.

Next, as in step 503, a check is performed (such as through the MDM system) to determine whether the avatar or the real-life customer (the human) behind the avatar is already known. If the customer is recognized as being a new customer, then a customer record is created in the MDM system as in step 504. An incentive is offered as in step 505 to encourage the human user operating the avatar to provide real-world information about themselves and to provide sufficient information to create a detailed profile of the customer.

If a customer is associated with the avatar as in step 503 (such that the customer is not recognized as a new customer), then the customer is known already in the MDM system, and the customer record is retrieved as in step 506. This customer record is checked to determine if any information on the customer's profile is incomplete. If the customer profile in the MDM system is incomplete as in step 507, then an incentive is offered as in step 505 to gather the remaining information about the customer. If the information collected for the customer is complete as in step 507, then incentives are offered to receive other useful information from the human user as in step 508, such as surveys, third party information, and the like.

Once the information is provided by the human user through the avatar, this information is stored within a data store as in step 509, particularly the MDM system, although this profile may be eventually pushed and/or synchronized to one or more CRM systems. The incentive is then provided to the user as in step 510. Finally, consistent with a further embodiment, a marketing campaign is launched as in step 511 with use of the data synchronized with the CRM system to utilize the real-world information about the customer collected through the avatar.

One skilled in the art would recognize that incentives could be offered in many different quantities and provided at many different times and in response to various questions through use of the virtual world. Further, the timing, content, and delivery of the incentives may be customized to the requirements of the eventual marketing campaign or marketing strategy.

As will also be appreciated by one skilled in the art, the present invention may be embodied as a system, method, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including, but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method for turning virtual world participants into real life leads, comprising:
   presenting, by a processor, a virtual location within a virtual world for access by an avatar, the avatar operated by a real-world human user;
   performing, by a processor, an interaction with the avatar within the virtual world responsive to the avatar accessing the virtual location;
   identifying, by a processor, the avatar based on characteristics of the avatar within the virtual world, including avatar ID and avatar name;
   determining, by a processor, whether the avatar is associated with an existing customer registration, and determining whether the existing customer registration for the avatar identifies a real-world customer based on the identified characteristics of the avatar, the existing customer registration stored in a master data management (MDM) server tracking customer registrations for a plurality of human users and connected to a plurality of customer relationship management (CRM) terminals;
   creating, by a processor, a customer registration within the MDM server responsive to determining the avatar is not associated with the existing customer registration stored in the MDM server;
   locating, by a processor, the existing customer registration within the MDM server responsive to determining the avatar is associated with the existing customer registration stored in the MDM server;
   collecting, by a processor, real-world information about the real-world human user operating the avatar through the interaction with the avatar;
   storing, by a processor, the collected real-world information in association with the existing customer registration into a customer registration database within the MDM server; and
   communicating, by a processor, the real-world information stored in the customer registration database within the MDM server to the plurality of CRM terminals,
   wherein the existing customer registration in the MDM server identifying the real-world customer is associated with a plurality of avatars from a plurality of virtual worlds so the real-world information of each of the real-world customers is identified through the characteristics of the plurality of avatars from the plurality of virtual worlds,
   wherein the plurality of avatars from the plurality of virtual worlds are connected to the MDM server by a plurality of virtual world connectors,
   wherein the MDM server sends a CRM relevant customer information to one or more of the plurality of CRM terminals and initiates a create lead operation on the one or more CRM terminals;
   wherein, the create lead operation comprises, in response to the determining indicating that a new avatar is registered, triggering a first dialog with the avatar offering a first incentive to the avatar through the respective one or more CRM terminals; and in response to the determining indicating that the avatar is registered in the MDM server and the determining further indicating that none of the identified characteristics are available for the real-world customer, triggering a second dialog with the avatar offering a second incentive that is larger than the first incentive through the respective one or more terminals,
   wherein the MDM server receives incoming data from the one or more CRM terminals, in response to one of the first and the second offering,
   wherein the MDM server comprises a synchronization component which invokes an algorithm to:
   standardize the incoming data from each of the one or more CRM terminals;

detect whether any information in the incoming data is duplicate of information corresponding to the new avatar or the existing customer registration stored in the MDM server; and associate the incoming data with the existing customer registration stored in MDM server after removing the duplicate information, and wherein the MDM server selectively pushes synchronized information stored in the MDM server to the plurality of CRM terminals such that any changes made to the CRM relevant customer information through the respective one or more CRM terminals is persisted in the respective one or more CRM terminals only after approval by the synchronization component of the MDM server.

2. The method of claim 1, further comprising performing a marketing campaign directed towards the human user utilizing real-world information about the human user compiled within the plurality of CRM terminals.

3. The method of claim 1, further comprising verifying the real-world information provided by the real world user operating the avatar.

4. The method of claim 1, wherein the offering incentives to the avatar is to obtain the real-world information about the human user operating the avatar; and to provide the incentives responsive to the human user providing the real-world information through the interaction with the avatar.

5. The method of claim 1, wherein the human user is associated with one or more avatars within the virtual world.

6. The method of claim 1, wherein the virtual world connectors use logic and data in the MDM server to determine whether the real life person behind the avatars are already known within the MDM server.

7. The method of claim 1, wherein the MDM server comprises a synchronization component which invokes an algorithm to verify the incoming data and to selectively push verified data from MDM server to the CRM terminal, the algorithm comprises name and postal address verification algorithm to verify whether provided name and address information is an existing real-world name and address.

8. The method of claim 1, wherein the first incentive is a first certificate providing a first discount on a purchase and the second incentive is a second certificate providing a second discount on the purchase, which is larger than the first discount.

9. A system, comprising:
at least one processor; and
at least one memory storing instructions operable with the at least one processor for turning virtual world participants into real life leads, the instructions being executed for:
presenting a virtual location within a virtual world for access by an avatar, the avatar operated by a real-world human user;
performing an interaction with the avatar within the virtual world responsive to the avatar accessing the virtual location;
identifying the avatar based on characteristics of the avatar within the virtual world, including avatar ID and avatar name;
determining whether the avatar is associated with an existing customer registration, and determining whether the existing customer registration for the avatar identifies a real-world customer stored in a master data management (MDM) server based on the identified characteristics of the avatar, the existing customer registration stored in the MDM server tracking customer registrations for a plurality of human users and connected to a plurality of customer relationship management (CRM) terminals;
creating a customer registration within the MDM server responsive to determining the avatar is not associated with the existing customer registration stored in the MDM server;
locating the existing customer registration within the MDM server responsive to determining the avatar is associated with the existing customer registration stored in the MDM server;
collecting real-world information about the real-world human user operating the avatar through the interaction with the avatar;
storing the collected real-world information in association with the existing customer registration into a customer registration database within the MDM server; and
communicating the real-world information stored in the customer registration database within the MDM server to the plurality of CRM terminals,
wherein the existing customer registration in the MDM server identifying the real-world customer is associated with a plurality of avatars from a plurality of virtual worlds so the real-world information of each of the real-world customers is identified through the characteristics of the plurality of avatars from the plurality of virtual worlds,
wherein the plurality of avatars from the plurality of virtual worlds are connected to the MDM server by a plurality of virtual world connectors,
wherein the MDM server sends a CRM relevant customer information to one or more of the plurality of CRM terminals and initiates a create lead operation on the one or more CRM terminals;
wherein, the create lead operation comprises, in response to the determining indicating that a new avatar is registered, triggering a first dialog with the avatar offering a first incentive to the avatar through the respective one or more CRM terminals; and in response to the determining indicating that the avatar is registered in the MDM server and the determining further indicating that none of the identified characteristics are available for the real-world customer, triggering a second dialog with the avatar offering a second incentive that is larger than the first incentive through the respective one or more terminals,
wherein the MDM server receives incoming data from the one or more CRM terminals, in response to one of the first and the second offering,
wherein the MDM server comprises a synchronization component which invokes an algorithm to:
standardize the incoming data from each of the one or more CRM terminals;
detect whether any information in the incoming data is duplicate of information corresponding to the new avatar or the existing customer registration stored in the MDM server; and
associate the incoming data with the existing customer registration stored in MDM server after removing the duplicate information, and
wherein the MDM server selectively pushes synchronized information stored in the MDM server to the plurality of CRM terminals such that any changes made to the CRM relevant customer information through the respective one or more CRM terminals is persisted in the respective one or more CRM terminals only after approval by the synchronization component of the MDM server.

10. A non-transitory computer program product comprising a computer useable medium having a computer readable program for turning virtual world participants into real life leads, wherein the computer readable program when executed on a computer causes the computer to:
 present a virtual location within a virtual world for access by an avatar, the avatar operated by a real-world human user;
 perform an interaction with the avatar within the virtual world responsive to the avatar accessing the virtual location;
 identify the avatar based on characteristics of the avatar within the virtual world, including avatar ID and avatar name;
 determine whether the avatar is associated with an existing customer registration, and determining whether the existing customer registration for the avatar identifies a real-world customer based on the identified characteristics of the avatar, the existing customer registration stored in a master data management (MDM) server tracking customer registrations for a plurality of human users and connected to a plurality of customer relationship management (CRM) terminals;
 create a customer registration within the MDM server responsive to determining the avatar is not associated with the existing customer registration stored in the MDM server;
 locate the existing customer registration within the MDM server responsive to determining the avatar is associated with the existing customer registration stored in the MDM server;
 collect real-world information about the real-world human user operating the avatar through the interaction with the avatar;
 store the collected real-world information in association with the existing customer registration into a customer registration database within the MDM server; and
 communicate the real-world information stored in the customer registration database within the MDM server to the plurality of CRM terminals,
 wherein the existing customer registration in the MDM server identifying the real-world customer is associated with a plurality of avatars from a plurality of virtual worlds so the real-world information of each of the real-world customers is identified through the characteristics of the plurality of avatars from the plurality of virtual worlds,
 wherein the plurality of avatars from the plurality of virtual worlds are connected to the MDM server by a plurality of virtual world connectors,
 wherein the MDM server sends a CRM relevant customer information to one or more of the plurality of CRM terminals and initiates a create lead operation on the one or more CRM terminals;
 wherein, in response to the determining indicating that a new avatar is registered, triggering a dialog with the avatar offering a first incentive to the avatar; and
 wherein, the create lead operation comprises, in response to the determining indicating that the avatar is registered in the MDM server, triggering a first dialog with the avatar offering a first incentive to the avatar through the respective one or more CRM terminals; and in response to the determining indicating that the avatar is registered in the MDM server and the determining further indicating that none of the identified characteristics are available for the real-world customer, triggering a second dialog with the avatar offering of a second incentive that is larger than the first incentive through the respective one or more terminals,
 wherein the MDM server receives incoming data from the one or more CRM terminals, in response to one of the first and the second offering,
 wherein the MDM server comprises a synchronization component which invokes an algorithm to:
  standardize the incoming data from each of the one or more CRM terminals;
  detect whether any information in the incoming data is duplicate of information corresponding to the new avatar or the existing customer registration stored in the MDM server; and
  associate the incoming data with the existing customer registration stored in MDM server after removing the duplicate information, and
 wherein the MDM server selectively pushes synchronized information stored in the MDM server to the plurality of CRM terminals such that any changes made to the CRM relevant customer information through the respective one or more CRM terminals is persisted in the respective one or more CRM terminals only after approval by the synchronization component of the MDM server.

* * * * *